US007515147B2

(12) United States Patent
Mignard

(10) Patent No.: US 7,515,147 B2
(45) Date of Patent: Apr. 7, 2009

(54) STAGGERED COLUMN DRIVE CIRCUIT SYSTEMS AND METHODS

(75) Inventor: Marc Mignard, Berkeley, CA (US)

(73) Assignee: IDC, LLC, San Francisco, CA (US)

( * ) Notice: Subject to any disclaimer, the term of this patent is extended or adjusted under 35 U.S.C. 154(b) by 493 days.

(21) Appl. No.: 11/054,703

(22) Filed: Feb. 8, 2005

(65) Prior Publication Data

US 2006/0044246 A1 Mar. 2, 2006

Related U.S. Application Data

(60) Provisional application No. 60/614,032, filed on Sep. 27, 2004, provisional application No. 60/604,893, filed on Aug. 27, 2004.

(51) Int. Cl.
*G06F 3/038* (2006.01)

(52) U.S. Cl. ....................................... 345/204; 345/100

(58) Field of Classification Search ........... 345/87–100, 345/204

See application file for complete search history.

(56) References Cited

U.S. PATENT DOCUMENTS

| | | | | |
|---|---|---|---|---|
| 3,982,239 A | | 9/1976 | Sherr | |
| 4,403,248 A | | 9/1983 | te Velde | |
| 4,441,791 A | | 4/1984 | Hornbeck | |
| 4,459,182 A | | 7/1984 | te Velde | |
| 4,481,511 A | * | 11/1984 | Hanmura et al. | 345/100 |
| 4,482,213 A | | 11/1984 | Piliavin et al. | |
| 4,500,171 A | | 2/1985 | Penz et al. | |
| 4,519,676 A | | 5/1985 | te Velde | |
| 4,566,935 A | | 1/1986 | Hornbeck | |
| 4,571,603 A | | 2/1986 | Hornbeck et al. | |
| 4,596,992 A | | 6/1986 | Hornbeck | |
| 4,615,595 A | | 10/1986 | Hornbeck | |
| 4,636,784 A | * | 1/1987 | Delgrange et al. | 345/68 |
| 4,662,746 A | | 5/1987 | Hornbeck | |

(Continued)

FOREIGN PATENT DOCUMENTS

EP 0295802 A 12/1988

(Continued)

OTHER PUBLICATIONS

Bains, "Digital Paper Display Technology holds Promise for Portables", CommsDesign EE Times (2000).

(Continued)

*Primary Examiner*—Richard Hjerpe
*Assistant Examiner*—Kimnhung Nguyen
(74) *Attorney, Agent, or Firm*—Knobbe Martens Olson & Bear LLP

(57) ABSTRACT

A system and method for staggered actuation of columns of interferometric modulators. In one embodiment, the method determines data for actuating two or more groups of columns in the array, each group having one or more columns, and provides the data to the array to actuate two or more group of columns so that each group is activated during a group addressing period. In another embodiment, a display includes at least one driving circuit and an array comprising a plurality of interferometric modulators disposed in a plurality of columns and rows, said array being configured to be driven by said driving circuit which is configured to stagger the actuation of the plurality of columns during an array addressing period.

31 Claims, 7 Drawing Sheets

U.S. PATENT DOCUMENTS 4,681,403 A 7/1987 te Velde et al.
4,709,995 A 12/1987 Kuribayashi et al.
4,710,732 A 12/1987 Hornbeck
4,856,863 A 8/1989 Sampsell et al.
4,859,060 A 8/1989 Katagiri et al.
4,954,789 A 9/1990 Sampsell
4,956,619 A 9/1990 Hornbeck
4,980,775 A * 12/1990 Brody ........................ 348/383
4,982,184 A 1/1991 Kirkwood
5,018,256 A 5/1991 Hornbeck
5,028,939 A 7/1991 Hornbeck et al.
5,037,173 A 8/1991 Sampsell et al.
5,055,833 A 10/1991 Hehlen et al.
5,061,049 A 10/1991 Hornbeck
5,078,479 A 1/1992 Vuilleumier
5,079,544 A 1/1992 DeMond et al.
5,083,857 A 1/1992 Hornbeck
5,096,279 A 3/1992 Hornbeck et al.
5,099,353 A 3/1992 Hornbeck
5,124,834 A 6/1992 Cusano et al.
5,142,405 A 8/1992 Hornbeck
5,142,414 A 8/1992 Koehler et al.
5,162,787 A 11/1992 Thompson et al.
5,168,406 A 12/1992 Nelson
5,170,156 A 12/1992 DeMond et al.
5,172,262 A 12/1992 Hornbeck
5,179,274 A 1/1993 Sampsell
5,192,395 A 3/1993 Boysel et al.
5,192,946 A 3/1993 Thompson et al.
5,206,629 A 4/1993 DeMond et al.
5,212,582 A 5/1993 Nelson
5,214,419 A 5/1993 DeMond et al.
5,214,420 A 5/1993 Thompson et al.
5,216,537 A 6/1993 Hornbeck
5,226,099 A 7/1993 Mignardi et al.
5,227,900 A 7/1993 Inaba et al.
5,231,532 A 7/1993 Magel et al.
5,233,385 A 8/1993 Sampsell
5,233,456 A 8/1993 Nelson
5,233,459 A 8/1993 Bozler et al.
5,254,980 A 10/1993 Hendrix et al.
5,272,473 A 12/1993 Thompson et al.
5,278,652 A 1/1994 Urbanus et al.
5,280,277 A 1/1994 Hornbeck
5,287,096 A 2/1994 Thompson et al.
5,287,215 A 2/1994 Warde et al.
5,296,950 A 3/1994 Lin et al.
5,305,640 A 4/1994 Boysel et al.
5,312,513 A 5/1994 Florence et al.
5,323,002 A 6/1994 Sampsell et al.
5,325,116 A 6/1994 Sampsell
5,327,286 A 7/1994 Sampsell et al.
5,331,454 A 7/1994 Hornbeck
5,339,116 A 8/1994 Urbanus et al.
5,365,283 A 11/1994 Doherty et al.
5,411,769 A 5/1995 Hornbeck
5,444,566 A 8/1995 Gale et al.
5,446,479 A 8/1995 Thompson et al.
5,448,314 A 9/1995 Heimbuch et al.
5,452,024 A 9/1995 Sampsell
5,454,906 A 10/1995 Baker et al.
5,457,493 A 10/1995 Leddy et al.
5,457,566 A 10/1995 Sampsell et al.
5,459,602 A 10/1995 Sampsell
5,461,411 A 10/1995 Florence et al.
5,475,397 A * 12/1995 Saidi ........................... 345/95
5,488,505 A 1/1996 Engle
5,489,952 A 2/1996 Gove et al.
5,497,172 A 3/1996 Doherty et al.
5,497,197 A 3/1996 Gove et al.
5,499,062 A 3/1996 Urbanus
5,506,597 A 4/1996 Thompson et al.
5,515,076 A 5/1996 Thompson et al.
5,517,347 A 5/1996 Sampsell
5,523,803 A 6/1996 Urbanus et al.
5,526,051 A 6/1996 Gove et al.
5,526,172 A 6/1996 Kanack
5,526,688 A 6/1996 Boysel et al.
5,535,047 A 7/1996 Hornbeck
5,548,301 A 8/1996 Kornher et al.
5,551,293 A 9/1996 Boysel et al.
5,552,924 A 9/1996 Tregilgas
5,552,925 A 9/1996 Worley
5,563,398 A 10/1996 Sampsell
5,567,334 A 10/1996 Baker et al.
5,570,135 A 10/1996 Gove et al.
5,578,976 A 11/1996 Yao
5,581,272 A 12/1996 Conner et al.
5,583,688 A 12/1996 Hornbeck
5,589,852 A 12/1996 Thompson et al.
5,597,736 A 1/1997 Sampsell
5,598,565 A 1/1997 Reinhardt
5,600,383 A 2/1997 Hornbeck
5,602,671 A 2/1997 Hornbeck
5,606,441 A 2/1997 Florence et al.
5,608,468 A 3/1997 Gove et al.
5,610,438 A 3/1997 Wallace et al.
5,610,624 A 3/1997 Bhuva
5,610,625 A 3/1997 Sampsell
5,612,713 A 3/1997 Bhuva et al.
5,619,061 A 4/1997 Goldsmith et al.
5,619,365 A 4/1997 Rhoads et al.
5,619,366 A 4/1997 Rhoads et al.
5,629,790 A 5/1997 Neukermans et al.
5,633,652 A 5/1997 Kanbe et al.
5,636,052 A 6/1997 Arney et al.
5,638,084 A 6/1997 Kalt
5,638,946 A 6/1997 Zavracky
5,646,768 A 7/1997 Kaeiyama
5,650,881 A 7/1997 Hornbeck
5,654,741 A 8/1997 Sampsell et al.
5,657,099 A 8/1997 Doherty et al.
5,659,374 A 8/1997 Gale, Jr. et al.
5,665,997 A 9/1997 Weaver et al.
5,745,193 A 4/1998 Urbanus et al.
5,745,281 A 4/1998 Yi et al.
5,754,160 A 5/1998 Shimizu et al.
5,771,116 A 6/1998 Miller et al.
5,784,189 A 7/1998 Bozler et al.
5,784,212 A 7/1998 Hornbeck
5,808,780 A 9/1998 McDonald
5,818,095 A 10/1998 Sampsell
5,828,367 A 10/1998 Kuga
5,835,255 A 11/1998 Miles
5,842,088 A 11/1998 Thompson
5,867,302 A 2/1999 Fleming et al.
5,912,758 A 6/1999 Knipe et al.
5,943,158 A 8/1999 Ford et al.
5,959,763 A 9/1999 Bozler et al.
5,966,235 A 10/1999 Walker et al.
5,986,796 A 11/1999 Miles
6,028,690 A 2/2000 Carter et al.
6,038,056 A 3/2000 Florence et al.
6,040,937 A 3/2000 Miles
6,049,317 A 4/2000 Thompson et al.
6,055,090 A 4/2000 Miles
6,061,075 A 5/2000 Nelson et al.
6,099,132 A 8/2000 Kaeriyama
6,100,872 A 8/2000 Aratani et al.
6,113,239 A 9/2000 Sampsell et al.
6,147,790 A 11/2000 Meier et al.
6,160,833 A 12/2000 Floyd et al.
6,180,428 B1 1/2001 Peeters et al.
6,201,633 B1 3/2001 Peeters et al.

6,232,936 B1 5/2001 Gove et al.
6,275,326 B1 8/2001 Bhalla et al.
6,282,010 B1 8/2001 Sulzbach et al.
6,295,154 B1 9/2001 Laor et al.
6,304,297 B1 10/2001 Swan
6,323,982 B1 11/2001 Hornbeck
6,327,071 B1 12/2001 Kimura
6,356,085 B1 3/2002 Ryat et al.
6,356,254 B1 3/2002 Kimura
6,429,601 B1 8/2002 Friend et al.
6,433,917 B1 8/2002 Mei et al.
6,447,126 B1 9/2002 Hornbeck
6,465,355 B1 10/2002 Horsley
6,466,358 B2 10/2002 Tew
6,473,274 B1 10/2002 Maimone et al.
6,480,177 B2 11/2002 Doherty et al.
6,496,122 B2 12/2002 Sampsell
6,501,107 B1 12/2002 Sinclair et al.
6,507,330 B1 1/2003 Handschy et al.
6,507,331 B1 1/2003 Schlangen et al.
6,545,335 B1 4/2003 Chua et al.
6,548,908 B2 4/2003 Chua et al.
6,549,338 B1 4/2003 Wolverton et al.
6,552,840 B2 4/2003 Knipe
6,574,033 B1 6/2003 Chui et al.
6,589,625 B1 7/2003 Kothari et al.
6,593,934 B1 7/2003 Liaw et al.
6,600,201 B2 7/2003 Hartwell et al.
6,606,175 B1 8/2003 Sampsell et al.
6,625,047 B2 9/2003 Coleman, Jr.
6,630,786 B2 10/2003 Cummings et al.
6,632,698 B2 10/2003 Ives
6,636,187 B2 10/2003 Tajima et al.
6,643,069 B2 11/2003 Dewald
6,650,455 B2 11/2003 Miles
6,666,561 B1 12/2003 Blakley
6,674,090 B1 1/2004 Chua et al.
6,674,562 B1 1/2004 Miles
6,680,792 B2 1/2004 Miles
6,710,908 B2 3/2004 Miles et al.
6,713,695 B2 3/2004 Kawai et al.
6,741,377 B2 5/2004 Miles
6,741,384 B1 5/2004 Martin et al.
6,741,503 B1 5/2004 Farris et al.
6,747,785 B2 6/2004 Chen et al.
6,762,873 B1 7/2004 Coker et al.
6,775,174 B2 8/2004 Huffman et al.
6,778,155 B2 8/2004 Doherty et al.
6,781,643 B1 8/2004 Watanabe et al.
6,787,384 B2 9/2004 Okumura
6,787,438 B1 9/2004 Nelson
6,788,520 B1 9/2004 Behin et al.
6,794,119 B2 9/2004 Miles
6,811,267 B1 11/2004 Allen et al.
6,813,060 B1 11/2004 Garcia et al.
6,819,469 B1 11/2004 Koba
6,822,628 B2 11/2004 Dunphy et al.
6,829,132 B2 12/2004 Martin et al.
6,853,129 B1 2/2005 Cummings et al.
6,855,610 B2 2/2005 Tung et al.
6,859,218 B1 2/2005 Luman et al.
6,861,277 B1 3/2005 Monroe et al.
6,862,022 B2 3/2005 Slupe
6,862,029 B1 3/2005 D'Souza et al.
6,867,896 B2 3/2005 Miles
6,870,581 B2 3/2005 Li et al.
6,903,860 B2 6/2005 Ishii
7,034,783 B2 4/2006 Gates et al.
7,123,216 B1 10/2006 Miles
7,161,728 B2 1/2007 Sampsell et al.
7,190,337 B2 * 3/2007 Miller et al. .................. 345/87
2001/0003487 A1 6/2001 Miles
2001/0026250 A1 10/2001 Inoue et al.
2001/0034075 A1 10/2001 Onoya
2001/0043171 A1 11/2001 Van Gorkom et al.
2001/0046081 A1 11/2001 Hayashi et al.
2001/0051014 A1 12/2001 Behin et al.
2002/0000959 A1 1/2002 Colgan et al.
2002/0005827 A1 1/2002 Kobayashi
2002/0012159 A1 1/2002 Tew
2002/0015215 A1 2/2002 Miles
2002/0024711 A1 2/2002 Miles
2002/0036304 A1 3/2002 Ehmke et al.
2002/0050708 A1 5/2002 Conklin et al.
2002/0050882 A1 5/2002 Hyman et al.
2002/0054424 A1 5/2002 Miles et al.
2002/0075226 A1 6/2002 Lippincott
2002/0075555 A1 6/2002 Miles
2002/0093722 A1 7/2002 Chan et al.
2002/0097133 A1 7/2002 Charvet et al.
2002/0122032 A1 * 9/2002 Hector et al. ............... 345/204
2002/0126364 A1 9/2002 Miles
2002/0179421 A1 12/2002 Williams et al.
2002/0186108 A1 12/2002 Hallbjorner
2003/0004272 A1 1/2003 Power
2003/0043157 A1 3/2003 Miles
2003/0072070 A1 4/2003 Miles
2003/0122773 A1 7/2003 Washio et al.
2003/0137215 A1 7/2003 Cabuz
2003/0137521 A1 7/2003 Zehner et al.
2003/0189536 A1 10/2003 Ruigt
2003/0202264 A1 10/2003 Weber et al.
2003/0202265 A1 10/2003 Reboa et al.
2003/0202266 A1 10/2003 Ring et al.
2004/0008396 A1 1/2004 Stappaerts
2004/0022044 A1 2/2004 Yasuoka et al.
2004/0027701 A1 2/2004 Ishikawa
2004/0051929 A1 3/2004 Sampsell et al.
2004/0058532 A1 3/2004 Miles et al.
2004/0080807 A1 4/2004 Chen et al.
2004/0145049 A1 7/2004 McKinnell et al.
2004/0145553 A1 7/2004 Sala et al.
2004/0147056 A1 7/2004 McKinnell et al.
2004/0160143 A1 8/2004 Shreeve et al.
2004/0174583 A1 9/2004 Chen et al.
2004/0179281 A1 9/2004 Reboa
2004/0207587 A1 * 10/2004 Chen et al. .................... 345/87
2004/0212026 A1 10/2004 Van Brocklin et al.
2004/0217378 A1 11/2004 Martin et al.
2004/0217919 A1 11/2004 Pichl et al.
2004/0218251 A1 11/2004 Piehl et al.
2004/0218334 A1 11/2004 Martin et al.
2004/0218341 A1 11/2004 Martin et al.
2004/0223204 A1 11/2004 Mao et al.
2004/0227493 A1 11/2004 Van Brocklin et al.
2004/0233151 A1 * 11/2004 Hector et al. ................ 345/87
2004/0240032 A1 12/2004 Miles
2004/0240138 A1 12/2004 Martin et al.
2004/0245588 A1 12/2004 Nikkel et al.
2004/0263944 A1 12/2004 Miles et al.
2005/0001797 A1 * 1/2005 Miller et al. .................. 345/87
2005/0001828 A1 * 1/2005 Martin et al. ............... 345/204
2005/0012577 A1 1/2005 Pillans et al.
2005/0038950 A1 2/2005 Adelmann
2005/0057442 A1 3/2005 Way
2005/0068583 A1 3/2005 Gutkowski et al.
2005/0069209 A1 3/2005 Damera-Venkata et al.
2005/0116924 A1 6/2005 Sauvante et al.
2005/0168431 A1 * 8/2005 Chui .......................... 345/100
2005/0206991 A1 9/2005 Chui et al.
2005/0264548 A1 12/2005 Okamura et al.
2005/0286113 A1 12/2005 Miles
2005/0286114 A1 12/2005 Miles
2006/0017684 A1 * 1/2006 Fish ........................... 345/100
2006/0044298 A1 3/2006 Mignard et al.
2006/0044928 A1 3/2006 Chui et al.

| | | | |
|---|---|---|---|
| 2006/0056000 | A1 | 3/2006 | Mignard |
| 2006/0057754 | A1 | 3/2006 | Cummings |
| 2006/0066542 | A1 | 3/2006 | Chui |
| 2006/0066559 | A1 | 3/2006 | Chui et al. |
| 2006/0066560 | A1 | 3/2006 | Gally et al. |
| 2006/0066561 | A1 | 3/2006 | Chui et al. |
| 2006/0066594 | A1 | 3/2006 | Tyger |
| 2006/0066597 | A1 | 3/2006 | Sampsell |
| 2006/0066598 | A1 | 3/2006 | Floyd |
| 2006/0066601 | A1 | 3/2006 | Kothari |
| 2006/0066937 | A1 | 3/2006 | Chui |
| 2006/0066938 | A1 | 3/2006 | Chui |
| 2006/0067648 | A1 | 3/2006 | Chui et al. |
| 2006/0067653 | A1 | 3/2006 | Gally et al. |
| 2006/0077127 | A1 | 4/2006 | Sampsell et al. |
| 2006/0077505 | A1 | 4/2006 | Chui et al. |
| 2006/0077520 | A1 | 4/2006 | Chui et al. |
| 2006/0103613 | A1 | 5/2006 | Chui |
| 2007/0177247 | A1 | 8/2007 | Miles |

FOREIGN PATENT DOCUMENTS

| | | | |
|---|---|---|---|
| EP | 0300754 | A2 | 1/1989 |
| EP | 0306308 | A2 | 3/1989 |
| EP | 0318050 | A | 5/1989 |
| EP | 0 417 523 | A | 3/1991 |
| EP | 0 467 048 | A | 1/1992 |
| EP | 0570906 | A | 11/1993 |
| EP | 0608056 | A1 | 7/1994 |
| EP | 0655725 | A1 | 5/1995 |
| EP | 0 667 548 | A1 | 8/1995 |
| EP | 0725380 | A1 | 8/1996 |
| EP | 0852371 | A1 | 7/1998 |
| EP | 0911794 | A1 | 4/1999 |
| EP | 1 017 038 | A | 7/2000 |
| EP | 1 146 533 | A | 10/2001 |
| EP | 1 239 448 | | 9/2002 |
| EP | 1 280 129 | | 1/2003 |
| EP | 1343190 | A | 9/2003 |
| EP | 1345197 | A | 9/2003 |
| EP | 1381023 | A | 1/2004 |
| EP | 1 414 011 | | 4/2004 |
| EP | 1473691 | A2 | 11/2004 |
| GB | 2401200 | A | 11/2004 |
| JP | 2004-29571 | | 1/2004 |
| WO | WO 95/30924 | | 11/1995 |
| WO | WO 97/17628 | | 5/1997 |
| WO | WO 99/52006 | A3 | 10/1999 |
| WO | WO 01/73937 | A | 10/2001 |
| WO | WO 02/089103 | | 11/2002 |
| WO | WO 03/007049 | A1 | 1/2003 |
| WO | WO 03/015071 | A2 | 2/2003 |
| WO | WO 03/044765 | A2 | 5/2003 |
| WO | WO 03/060940 | A | 7/2003 |
| WO | WO 03/069413 | A1 | 8/2003 |
| WO | WO 03/073151 | A1 | 9/2003 |
| WO | WO 03/079323 | A | 9/2003 |
| WO | WO 03/090199 | A1 | 10/2003 |
| WO | WO 2004/006003 | A1 | 1/2004 |
| WO | WO 2004/026757 | A2 | 4/2004 |
| WO | WO 2004/049034 | A1 | 6/2004 |
| WO | WO 2004/054088 | | 6/2004 |

OTHER PUBLICATIONS

Lieberman, "MEMS Display Looks to give PDAs Sharper Image" EE Times (2004).

Lieberman, "Microbridges at heart of new MEMS displays" EE Times (2004).

Miles, MEMS-based interferometric modulator for display applications, Part of the SPIE Conference on Micromachined Devices and Components, vol. 3876, pp. 20-28 (1999).

Miles et al., 5.3: Digital Paper™: Reflective displays using interferometric modulation, SID Digest, vol. XXXI, 2000 pp. 32-35.

Office Action dated Sep. 11, 2007 in U.S. Appl. No. 11/182,389.

ISR and WO for PCT/US05/029161 filed Aug. 16, 2005.

IPRP for PCT/US05/029161 filed Aug. 16, 2005.

Chen et al., Low peak current driving scheme for passive matrix-OLED, SID International Symposium Digest of Technical Papers, May 2003, pp. 504-507.

Office Action dated Mar. 18, 2008 in U.S. Appl. No. 11/182,389.

Office Action received Nov. 30, 2007 in Chinese App. No. 200510093576.8.

Extended European Search Report dated Feb. 27, 2008 for App. No. 05255179.3.

Office Action dated Jul. 18, 2008 in Chinese App. No. 200580027721.0.

Seeger et al., "Stabilization of Electrostatically Actuated Mechanical Devices", (1997) International Conference on Solid State Sensors and Actuators; vol. 2, pp. 1133-1136.

Peroulis et al., Low contact resistance series MEMS switches, 2002, pp. 223-226, vol. 1, IEEE MTT-S International Microwave Symposium Digest, New York, NY.

* cited by examiner

Column Output Signals

| | | $+V_{bias}$ | $-V_{bias}$ |
|---|---|---|---|
| Row Output Signals | 0 | Stable | Stable |
| | $+\Delta V$ | Release | Actuate |

STAGGERED COLUMN DRIVE CIRCUIT SYSTEMS AND METHODS

CROSS REFERENCE TO RELATED APPLICATIONS

This application claims priority to U.S. Provisional Application No. 60/604,893, titled "CURRENT AND POWER MANAGEMENT IN MODULATOR ARRAYS," filed Aug. 27, 2004 and U.S. Provisional Application No. 60/614,032, titled "SYSTEM AND METHOD FOR INTERFEROMETRIC MODULATION," filed Sep. 27, 2004. Each of these provisional patent applications is incorporated by reference, in its entirety.

BACKGROUND

1. Field of the Invention

The field of the invention relates to microelectromechanical systems (MEMS).

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. An interferometric modulator may comprise a pair of conductive plates, one or both of which may be transparent and/or reflective in whole or part and capable of relative motion upon application of an appropriate electrical signal. One plate may comprise a stationary layer deposited on a substrate, the other plate may comprise a metallic membrane separated from the stationary layer by an air gap. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

In a first embodiment, the invention comprises a display, comprising at least one driving circuit, and an array comprising a plurality of interferometric modulators disposed in a plurality of columns and rows, said array being configured to be driven by said driving circuit, wherein said driving circuit is configured to stagger the assertion of a signal for two or more columns.

In one aspect of the first embodiment, the driving circuit staggers the assertion of a signal for two or more columns in a column addressing period, and wherein the driving circuit is further configured to strobe one or more rows with a signal during a row addressing period.

In a second aspect of the first embodiment, the driving circuit is further configured to assert signals on two or more groups of columns, each group having a group addressing period during the column addressing period, and each group having one or more columns, wherein the group addressing period of each group is at least partially different than the group addressing period of any other group.

In a third aspect of the first embodiment, the driving circuit is further configured to assert signals on two or more groups of columns, each group being activated during a group addressing period within the column addressing period, and each group having one or more columns.

In a fourth aspect of the first embodiment, the driving circuit is further configured to assert signals for two or more groups of columns, each group being activated during a group addressing period within a column addressing period, each group having one or more columns, wherein the relative start time for each group addressing period is temporally distinct.

In a fifth aspect of the first embodiment, the driving circuit is further configured to assert a signal for a first column during a first time period and a second column during a second time period, wherein at least a portion of the first time period and the second time period occur at different times.

In a sixth aspect of the first embodiment, each group has one column.

In a seventh aspect of the first embodiment, the driving circuit asserts signals for each group in a predetermined order.

In an eighth aspect of the first embodiment, the driving circuit asserts signals for one or more groups in a predetermined order.

In a ninth aspect of the first embodiment, the driving circuit asserts signals for one or more groups in a random order.

In a tenth aspect of the first embodiment, each group contains the same number of columns.

In an eleventh aspect of the first embodiment, one or more groups contain a different number of columns.

In a twelfth aspect of the first embodiment, the driving circuit asserts signals for each column in a sequential order.

In a thirteenth aspect of the first embodiment, the driving circuit asserts signals for least two or more columns in a non-sequential order.

In a second embodiment, the invention comprises a display, comprising at least one driving circuit, and an array comprising a plurality of columns of interferometric modulators and a plurality of rows of interferometric modulators, said array being configured to be driven by said driving circuit, wherein said driving circuit is configured to receive column data for the plurality of columns, and is further configured to use the column data to non-simultaneously assert a signal on each of two or more columns of interferometric modulators during a column addressing period and to assert a signal on each of one or more rows during a row addressing period.

In a third embodiment, the invention comprises a method of providing data to an array having a plurality of columns of interferometric modulators and rows of interferometric modulators, the method comprising, asserting a signal for each of the columns in the first group of columns based on a first data set during a first group addressing period in an array addressing period, asserting a signal for each of the columns in the second group of columns using a second data set during a second group addressing period in the array addressing period, the second group addressing period overlapping the first group addressing period during a portion of time, and asserting a signal in a first row during the portion of time to actuate interferometric modulators in the first row.

In one aspect of the third embodiment, the first group includes a different number of columns than the second group.

In a second aspect of the third embodiment, the first group addressing period and the second group addressing period are in a predetermined order.

In a third aspect of the third embodiment, the first group addressing period and the second group addressing period are in a random order.

In a fourth aspect of the third embodiment, first group includes the same number of columns as the second group.

In a fourth embodiment, the invention comprises a method of providing data to an array having a plurality of columns of interferometric modulators and rows of interferometric modulators, the method comprising receiving data for two or more groups of columns in the array, each group having one or more columns, and asserting signals based on the data to the two or more groups such that signals are asserted on two or more groups beginning at different times and there is a period of time when signals are asserted on all the groups at the same time.

In one aspect of the fourth embodiment, each group contains the same number of columns.

In a second aspect of the fourth embodiment, a group addressing period of each group is at least partially different than a group addressing period for any other group.

In a third aspect of the fourth embodiment, a group addressing period of each group begins at a temporally distinct time.

In a fourth aspect of the fourth embodiment, a group addressing period of two or more groups are in a predetermined order.

In a fifth aspect of the fourth embodiment, a group addressing period of two or more groups are in a random order.

In a fifth embodiment, the invention comprises a display, comprising an array comprising a plurality of interferometric modulators, each of the interferometric modulators being connected to a column electrode and a row electrode, and a driving circuit connected to the column electrodes and row electrodes of said array and being configured to drive the array, said driving circuit configured to assert a signal on two or more columns beginning at two different times.

In a sixth embodiment, the invention comprises a driver circuit configured to drive an array of a plurality of interferometric modulators, each of the interferometric modulators being connected to a column electrode and a row electrode, the driving circuit comprising a storage device to store predetermined display data, a signal device in data communication with said storage device, said signal device configured to assert a signal on each column electrode of two or more columns non-simultaneously, wherein the signals are based on the predetermined display data.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the invention may be implemented in any device that is configured to display an image, whether in motion (e.g., video) or stationary (e.g., still image), and whether textual or pictorial. More particularly, it is contemplated that the invention may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
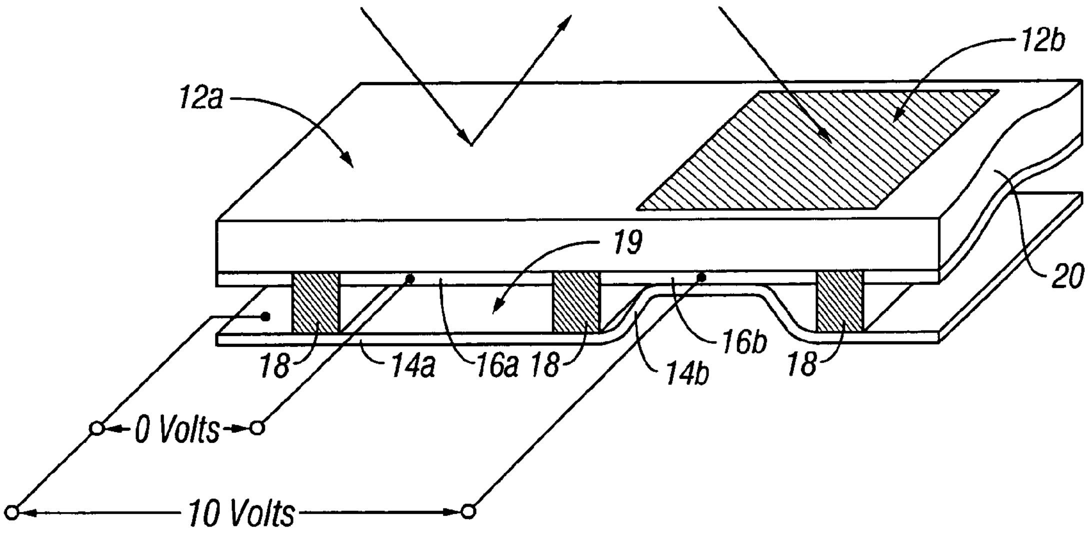
FIG. 1 is an isometric view depicting a portion of one embodiment of an interferometric modulator display in which a movable reflective layer of a first interferometric modulator is in a released position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the released state, the movable layer is positioned at a relatively large distance from a fixed partially reflective layer. In the second position, the movable layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12*a* and 12*b*. In the interferometric modulator 12*a* on the left, a movable and highly reflective layer 14*a* is illustrated in a released position at a predetermined distance from a fixed partially reflective layer 16*a*. In the interferometric modulator 12*b* on the right, the movable highly reflective layer 14*b* is illustrated in an actuated position adjacent to the fixed partially reflective layer 16*b*.

The fixed layers 16*a*, 16*b* are electrically conductive, partially transparent and partially reflective, and may be fabricated, for example, by depositing one or more layers each of chromium and indium-tin-oxide onto a transparent substrate 20. The layers are patterned into parallel strips, and may form row electrodes in a display device as described further below. The movable layers 14*a*, 14*b* may be formed as a series of parallel strips of a deposited metal layer or layers (orthogonal to the row electrodes 16*a*, 16*b*) deposited on top of posts 18 and an intervening sacrificial material deposited between the posts 18. When the sacrificial material is etched away, the deformable metal layers are separated from the fixed metal layers by a defined air gap 19. A highly conductive and reflective material such as aluminum may be used for the deformable layers, and these strips may form column electrodes in a display device.

With no applied voltage, the cavity 19 remains between the layers 14*a*, 16*a* and the deformable layer is in a mechanically relaxed state as illustrated by the pixel 12*a* in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable layer is deformed and is forced against the fixed layer (a dielectric material which is not illustrated in this Figure may be deposited on the fixed layer to prevent shorting and control the separation distance) as illustrated by the pixel 12*b* on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

Figure 2:
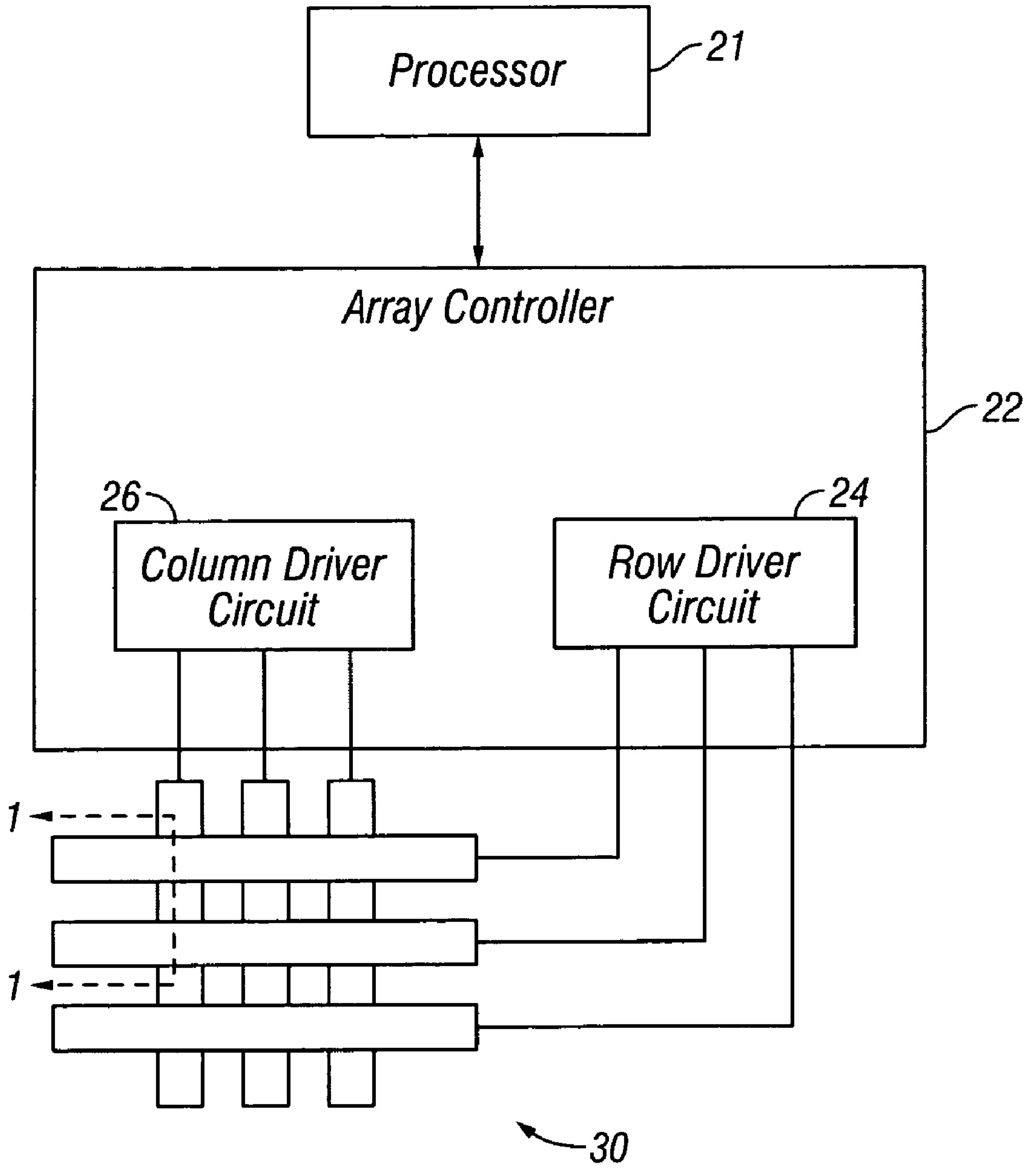
FIG. 2 is a system block diagram illustrating one embodiment of an electronic device incorporating a 3×3 interferometric modulator display.

FIGS. 2 through 5 illustrate one exemplary process and system for using an array of interferometric modulators in a display application. FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array controller 22. In one embodiment, the array controller 22 includes a row driver circuit 24 and a column driver circuit 26 that provide signals to a pixel array 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the released state to the actuated state. However, when the voltage is reduced from that value, the movable layer maintains its state as the voltage drops back below 10 volts. In the exemplary embodiment of FIG. 3, the movable layer does not release completely until the voltage drops below 2 volts. There is thus a range of voltage, about 3 to 7 V in the example illustrated in FIG. 3, where there exists a window of applied voltage within which the device is stable in either the released or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be released are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or released pre-existing state. Since each pixel of the interferometric modulator, whether in the actuated or released state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
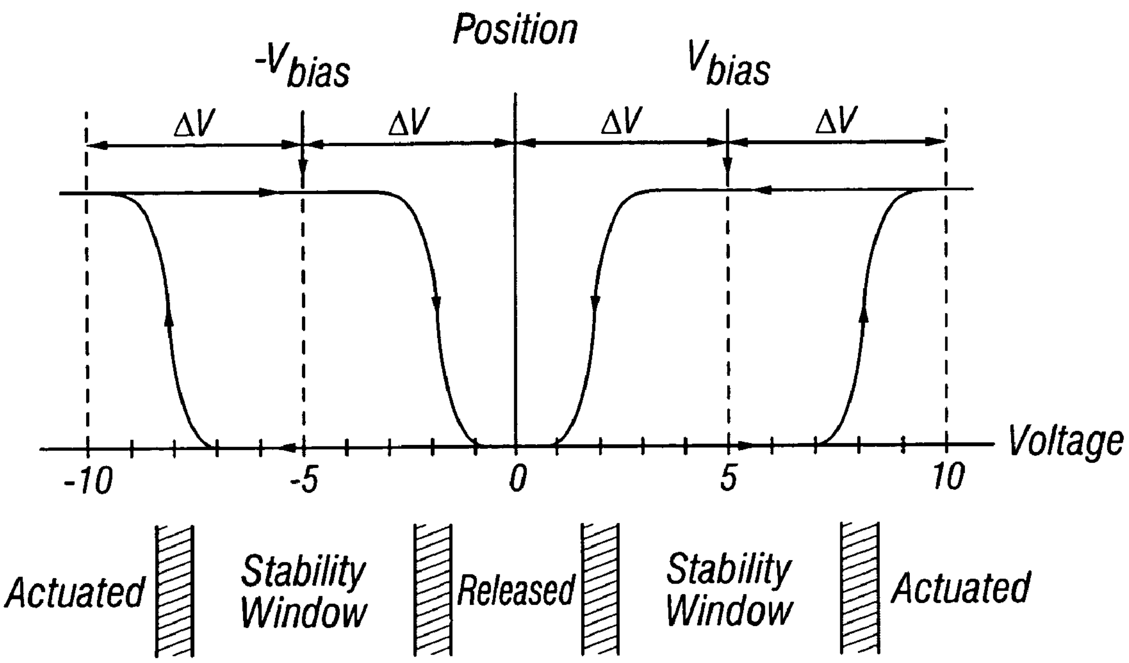
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to +ΔV, which may correspond to −5 volts and +5 volts respectively Releasing the pixel is accomplished by setting the appropriate column to $+V_{bias}$, and the appropriate row to the same +ΔV, producing a zero volt potential difference across the pixel. In those rows where the row voltage is held at zero volts, the pixels are stable in whatever state they were originally in, regardless of whether the column is at $+V_{bias}$, or $-V_{bias}$.

Figure 5A:
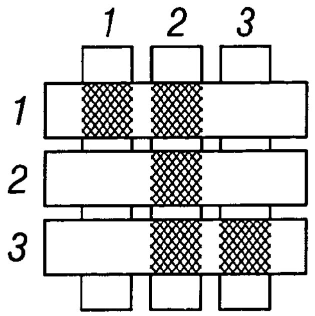
FIGS. 5A and 5B illustrate one exemplary timing diagram for row and column signals that may be used to write a frame of display data to the 3×3 interferometric modulator display of FIG. 2.
Figure 5B:
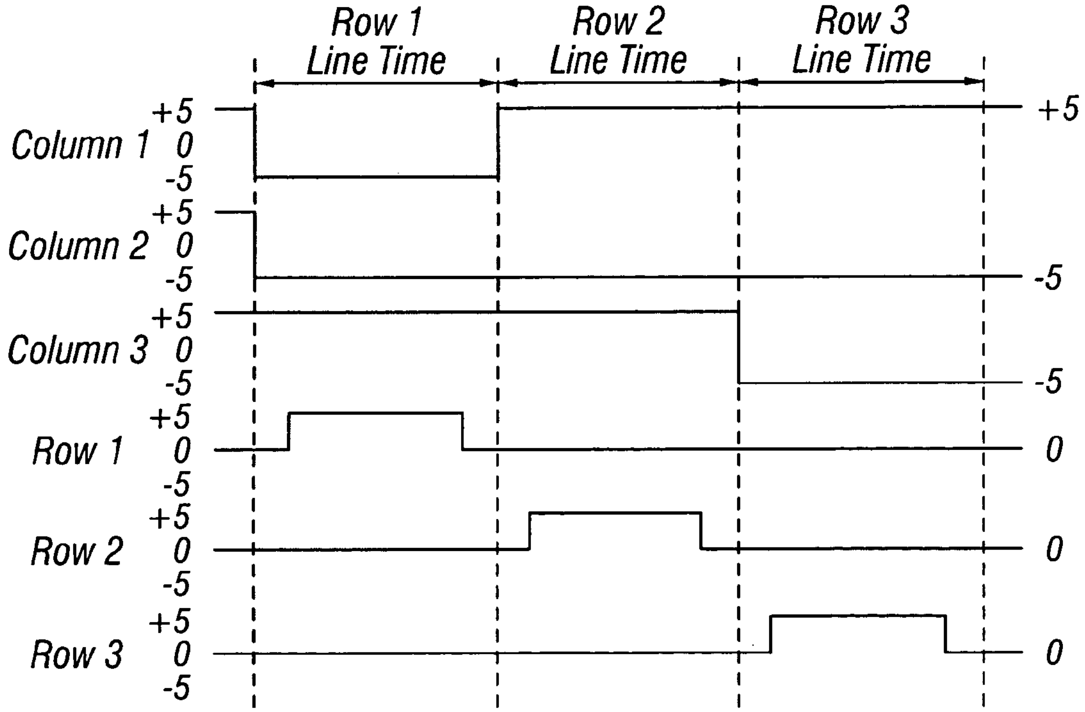

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or released states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and releases the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and release pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the present invention.

Figure 6A:
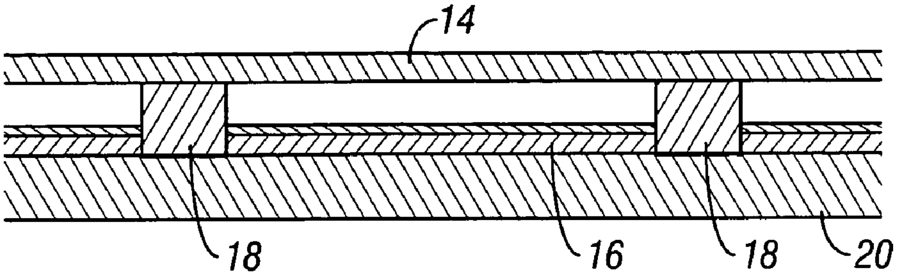
FIG. 6A is a cross section of the device of FIG. 1.
Figure 6B:
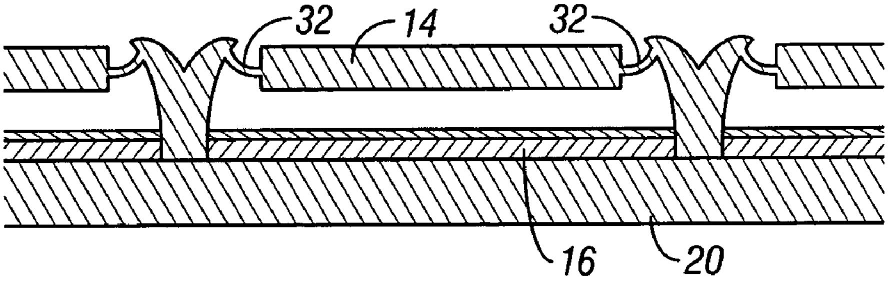
FIG. 6B is a cross section of an alternative embodiment of an interferometric modulator.
Figure 6C:
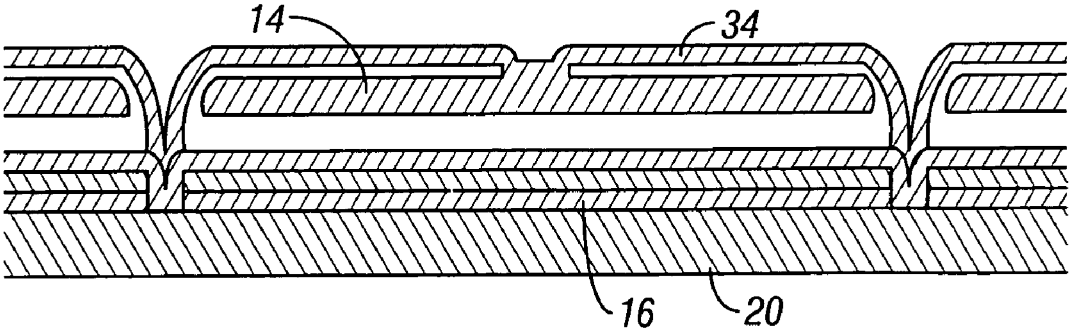
FIG. 6C is a cross section of another alternative embodiment of an interferometric modulator.

The details of the structure of interferometric modulators that operate in accordance with the principles set forth above may vary widely. For example, FIGS. 6A-6C illustrate three different embodiments of the moving mirror structure. FIG. 6A is a cross section of the embodiment of FIG. 1, where a strip of metal material 14 is deposited on orthogonally extending supports 18. In FIG. 6B, the moveable reflective material 14 is attached to supports at the corners only, on tethers 32. In FIG. 6C, the moveable reflective material 14 is suspended from a deformable layer 34. This embodiment has benefits because the structural design and materials used for the reflective material 14 can be optimized with respect to the optical properties, and the structural design and materials used for the deformable layer 34 can be optimized with respect to desired mechanical properties. The production of various types of interferometric devices is described in a variety of published documents, including, for example, U.S. Published Application 2004/0051929. A wide variety of well known techniques may be used to produce the above described structures involving a series of material deposition, patterning, and etching steps.

Figure 7:
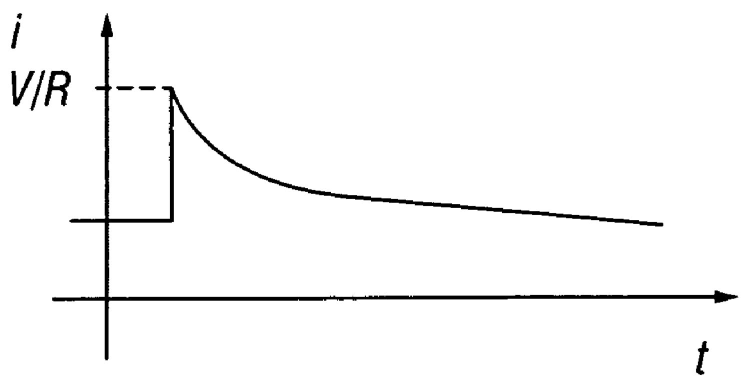
FIG. 7 is an illustration of a typical current flow on a column line during a quick change in voltage.

A MEMS interferometric modulator array consist of parallel conductive plates that move toward or away from each other to modulator the reflected light. Because of the capacitive nature of the pixels, a change in the voltage asserted on a column electrode can result in a large initial current flow, as illustrated in FIG. 7. Producing the peak current can require large, expensive capacitors, which contribute to the expense of the MEMS interferometric modulator array and influence its commercial feasibility. Methods of driving the display which reduce or eliminate large instantaneous current flows help reduce the cost of the displays incorporating this interferometric modulator technology.

One method of reducing a large instantaneous current flow and overcome the need for large, expensive capacitors is in the manner in which voltages are asserted on the columns and rows of a display. Commercially available display column drivers assert voltages on all the columns simultaneously. Asserting voltages on all the columns simultaneously causes large instantaneous currents to flow from the supplies through the driver circuit and into the display at the time the column voltages are changed. By staggering the time when a voltage is first asserted on the column electrode of one or more columns at least slightly, the current spike drawn from the power supply can be substantially reduced.

It will be appreciated that for display driver circuits, most of the peak current can be typically supplied to a column electrode by power supply bypass capacitors. Staggering the times when the voltage signals are asserted on the column electrodes allows less expensive, smaller bypass capacitors to be used. The peak current also flows through the driver integrated circuit, which can cause ground bounce on the integrated circuit due to parasitic inductance in the internal on-chip bond wires, and even destruction of the part. Staggering the assertion of signals on the columns helps alleviate this problem.

Figure 8:
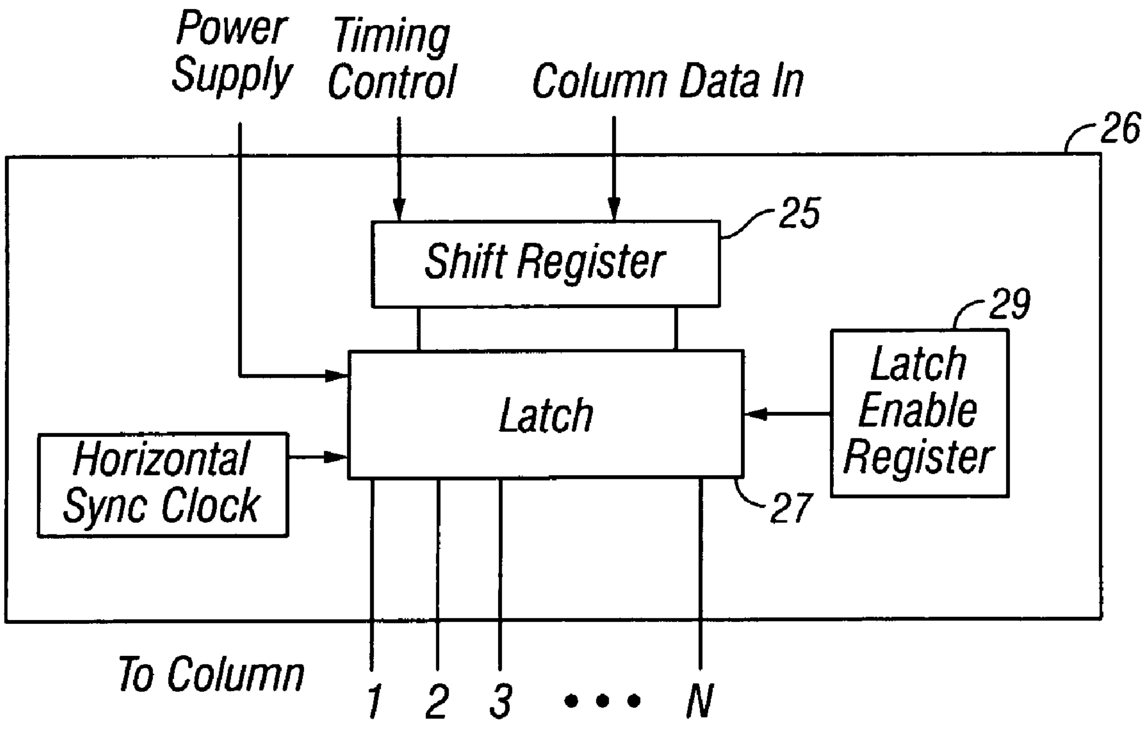
FIG. 8 is a partial schematic diagram of one embodiment of a bi-stable display device, such as an interferometric modulator display, incorporating circuitry to stagger column actuation in the column driver circuit.

One embodiment of a circuit for staggering the assertion of two or more column signals for a row-column array of modulators is shown in FIG. 8, which shows the column driver circuit 26 of FIG. 2 with outputs to exemplary columns 1, 2, 3, and N. The driver circuit 26 includes a shift register 25 that can be loaded with data indicating desired values for the columns at a particular time. The driving circuit 26 is connected to a data latch 27, which receives the data from the shift register 25 and asserts signals on one or more column electrodes based on the data stored in the shift register 25. According to this embodiment, the latch 27 has a data input, a clock input, a power input and an output to the array. In one embodiment, the latch 27 is configured so that when an event occurs, e.g., when the clock input to the latch 27 is active (e.g., upon detection of a leading edge of a clock pulse), the data provided to the input of the latch 27 is "latched," e.g., signals are asserted on the outputs of the latch 27 and provided to the connected column electrodes. The latch 27 can be configured so that the output of the latch 27 retains its data value until an event occurs again, e.g., the clock goes active again. In another embodiment, the data is latched when the clock input to the latch 27 goes inactive (e.g., detection of a falling edge of a clock pulse). The output of the latch 27 then retains its data value until the clock goes inactive again.

Column data is loaded into the shift register 25, shifting the column data down the shift register 25 until it is "full," at which time the data is ready to be latched. In this embodiment, instead of applying a column enable signal to the entire latch 27 causing the latch to assert the desired signals on all the column electrodes simultaneously, in this embodiment the driving circuit 26 is configured to provide a 'rolling enable,' e.g., to stagger the time when the latch 27 asserts the signals on the column electrodes. For example, in one embodiment the driving circuit 26 can include circuitry referred to herein functionally as a latch enable register 29, which is connected to the latch 27 and enables the latch 27 to assert staggered signals on the column electrodes.

It is appreciated that various circuits can be used to implement 'rolling enable;' for example the circuits can have built in delays for each output of the latch 27 or the latch 27 can be configured to assert a signal to one or more column electrodes based on an input which controls the latch 27 outputs. In various embodiments, the latch 27 can stagger the assertion of signals to the columns such that signals can be asserted individually, for example, column-by-column, or in two or more groups of columns, where, for example, each group of columns ("group") contains one or more columns. The latch 27 asserts a signal on each column in a group during a certain time-span, referred to herein as a group addressing period, which occurs during a column addressing period within an array addressing period.

As used herein, the term "group addressing period" is a broad term, and is used to describe a time period during which a signal is first asserted on each column electrode in a group of columns of a row-column array. As used herein, the term "column addressing period" is a broad term, and is used to describe a time period during which a signal is first asserted on the each electrode of the desired column(s). As used herein, the term "row addressing" period is a broad term, and is used to describe a time period during which a signal (e.g., strobe or pulse) is asserted on one row of a row-column array. As used herein, the term "array addressing period" is a broad term, and is used to describe a time period that includes a column addressing period and a row addressing period. It will be appreciated that when a signal is asserted on a column during the column addressing period, the signal can be sustained during the row addressing period so that an asserted row signal can change a pixel corresponding to a particular row and column. For any particular column group, its addressing period can be at least slightly different then the addressing period of one or more other groups. The columns of an array can be formed into two or more groups, each group having one or more columns. The group addressing periods can overlap or be temporally distinct. If the group addressing periods overlap, the portion of overlap between any of the groups can be identical or can be different. The group addressing periods can be in a predetermined order, for example, sequential order of the columns, or in a random order. These and other embodiments of the invention are also described in greater detail hereinbelow.

Figure 9:
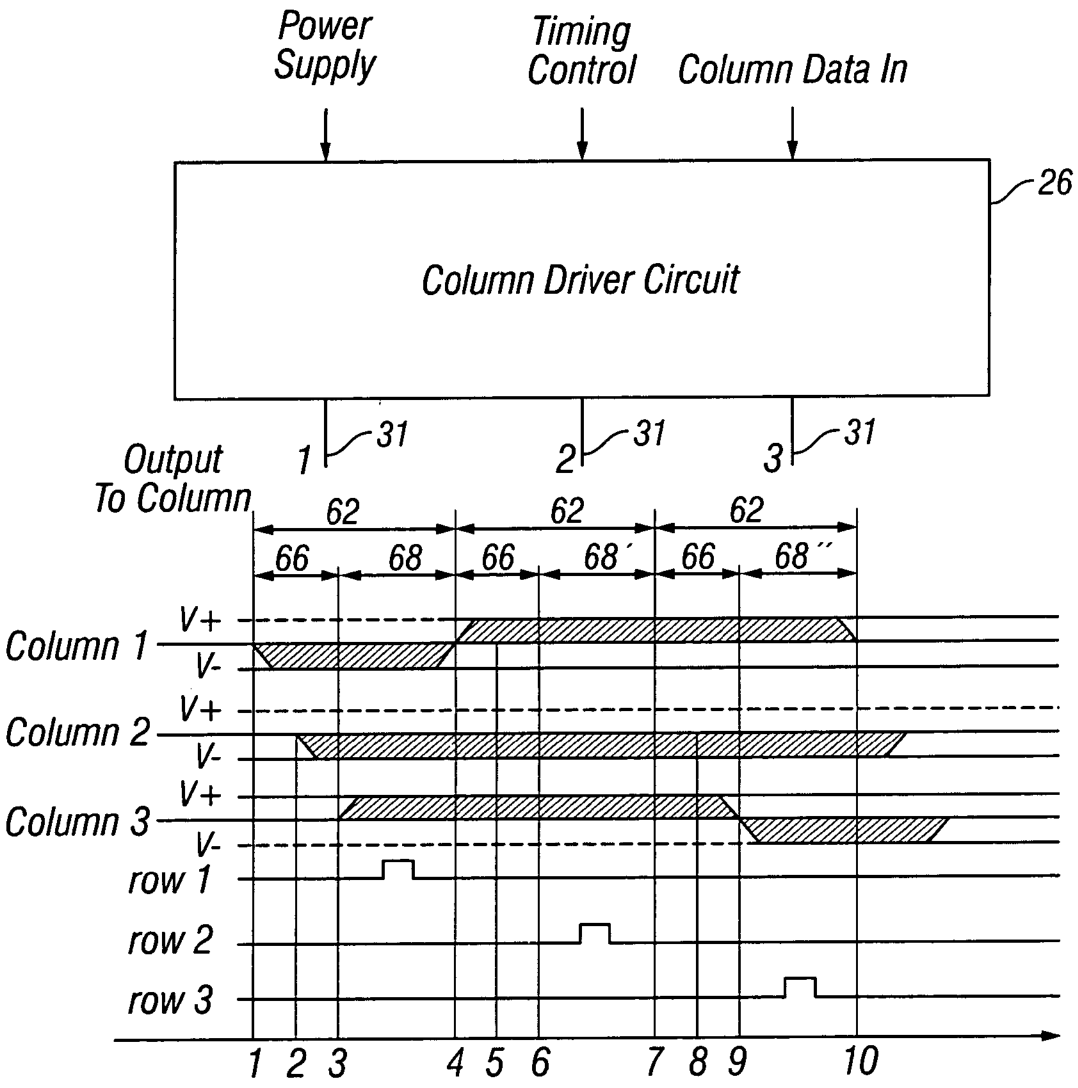
FIG. 9 illustrates one exemplary timing diagram for row and column signals that may be used to write a 3×3 interferometric display using a staggered scheme for asserting a signal.

FIG. 9 illustrates one embodiment of an exemplary timing diagram for row and column signals that may be used to write a 3×3 interferometric display using a staggered drive scheme for asserting a signal on each column electrode. In this scheme, signals are asserted on each column electrode in a staggered sequence, or on two or more groups of column electrodes in a staggered sequence (e.g., the column electrodes are configured as two or more groups so that a signal is asserted on each column electrode in the group at substantially the same time). Within an array addressing period 62 is a column addressing period 66 and a row addressing period 68. The time-span of the array addressing period 62 can be of various lengths and can be application dependent. Correspondingly, the time-span of the column address period 66 and the row address period 68 can also be of various lengths. For example, in one embodiment the time-span of the array addressing period 62 can be about 500 microseconds, the column addressing period 66 can be about 400 microseconds, and the row addressing period can be about 100 microseconds. If the latch staggers its output column-by-column so that it asserts a signal on another column electrode every 2 microseconds, one row of a display could be updated during the 500 microsecond array addressing period 62, and a 200 row display can be updated in about one-tenth of a second, in this example.

Still referring to FIG. 9, the output of the column driver 26 is a signal which is asserted on each of the three column electrodes 31. At time 1, the column driver circuit 26 asserts a signal on column 1 which is sustained until time 4. At time 2, the column driver circuit 26 asserts a signal on column 2 which is sustained until time 5, and at time 3 the column driver circuit 26 asserts a signal on column 3 which is sustained until time 6. Accordingly, during the period between time 3 and time 4, signals are asserted on all three columns. The time period between time 3 and time 4 corresponds with a row 1 addressing period 68, during which a strobe is applied to row 1 which actuates or releases the pixels of row 1 according to the signals asserted on the columns. This same process can be repeated for each row, so that a strobe applied to row 2 during the row 2 addressing period 68' (between time 6 and time 7) and to row 3 during the row 3 addressing period 68" (between time 9 and time 10).

As illustrated in this example, the output of the column driver circuit 26 for columns 1 and 2 are first set to $-V_{bias}$ and the output to column 3 is set to $+V_{bias}$. When a positive row pulse is applied to row 1 the (1,1) and (1,2) pixels are actuated, and the (1,3) pixel is released. The output of the column driver circuit 26 for columns 1 and 3 are then set to $+V_{bias}$ and the output to column 2 is set to $-V_{bias}$. Applying a positive row pulse to row 2 releases the (2,1) and (2,1) pixels and actuates the (2, 2) pixel. The output of the column driver circuit 26 for columns 2 and 3 are then set to $-V_{bias}$ and the output to column 1 is set to $+V_{bias}$. Applying a positive row pulse to row 2 releases the (3,1) pixel and actuates the (3, 2) and (3,3) pixel. The resulting pixel configuration of this example is the same as illustrated in FIG. 5A.

In some embodiments, the driving circuit 26 can stagger signals to two or more groups during the column addressing period which can also reduce the current spike, even if columns within the group are asserted substantially simultaneously. This embodiment may be particularly useful in displays with a large number of columns. In some embodiments, columns 1-N are clustered into groups where each group includes a certain number of columns, e.g., four columns. Signals are asserted on the column electrodes for the columns in each group at least substantially simultaneously, e.g., during the same group addressing period. The driver circuit 26 asserts signals for a first group during a first group addressing period, then asserts signals for a second group during a second group addressing period, etc., until signals are asserted for all groups. In other embodiments, the number of columns in each group can be one, two, three, or more than four.

In some embodiments where the columns are configured into groups, each of the groups can have the same number of columns. However, in some embodiments, the number of columns in each group can be different, or some groups may have the same number of columns and other groups may have a different number of columns. For example, in an eight column display, a first group can include columns 1 and 2, a second group can include just column 3, and a third group can include columns 4, 5, 6, 7, and 8.

In some embodiments, the driver circuit 26 asserts signals for the columns sequentially (e.g., column 1, column 2, etc.). In other embodiments the signals are asserted in a non-sequential order (e.g., column 3, column 1, column 2, etc.). In embodiments when the columns are configured into two or more groups, signals can be asserted for each group in a in a sequential or a non-sequential order. For example, signals can first be asserted for the columns in a first group that includes column 3, then a second group that includes columns 4, 5, 6, and 7, and finally a third group that includes columns 1 and 2. In some embodiments, the order of one or more of the groups is predetermined, in some embodiments the order of one or more groups is random, while in other embodiments the order of the groups can be a combination of predetermined and random.

At least a portion of the group addressing period for each group overlaps so that a strobe can be applied to a row actuating the desired interferometric modulators for that row during the overlap period (e.g., the row addressing period). The relative start of each group addressing period can be configured to affect the amount of current that is needed at any one time during the column addressing period.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

The invention claimed is:

1. A display, comprising:

at least one driving circuit; and an array comprising a plurality of interferometric modulators disposed in a plurality of columns and rows, said array being configured to be driven by said driving circuit, and said interferometric modulators having at least a released state and an actuated state, wherein said driving circuit is configured to stagger the assertion of a signal for two or more columns of interferometric modulators during a column addressing period and maintain the asserted signal on each column during a row addressing period, the row addressing period being subsequent to said column addressing period, and strobe a row of the array during the row addressing period to actuate or release interferometric modulators in the two or more columns of interferometric modulators disposed in said row.

2. The display of claim 1, wherein said driving circuit is further configured to assert signals on two or more groups of columns and maintain the asserted signals on said two or more groups during the row addressing period, the signals being asserted on each of the two or more groups during a group addressing period within the column addressing period, each group having one or more columns, wherein the group addressing period of each group is at least partially different than the group addressing period of any other group.

3. The display of claim 2, wherein each of said two or more groups has one column.

4. The display of claim 2, wherein said driving circuit asserts signals for each of said two or more groups in a predetermined order.

5. The display of claim 2, wherein said driving circuit asserts signals for one or more groups in a predetermined order.

6. The display of claim 2, wherein said driving circuit asserts signals for one or more groups in a random order.

7. The display of claim 2, wherein each group contains the same number of columns.

8. The display of claim 2, wherein one or more groups contain a different number of columns.

9. The display of claim 1, wherein said driving circuit is further configured to assert signals on two or more groups of columns and maintain the asserted signals on said two or more groups during a row addressing period, the signals being asserted on each group during a group addressing period within the column addressing period, and each group having one or more columns.

10. The display of claim 1, wherein said driving circuit is further configured to assert signals for two or more groups of columns and maintain the asserted signals on said two or more groups during a row addressing period, the signals being asserted on each group during a group addressing period within a column addressing period, each group having one or more columns, wherein the relative start time for each group addressing period is temporally distinct.

11. The display of claim 1, wherein said driving circuit is further configured to assert a signal for a first column at a first time and a second column at a second time, wherein the first time and the second time are different.

12. The display of claim 1, wherein said driving circuit asserts signals for each column in a sequential order.

13. The display of claim 1, wherein said driving circuit asserts signals for at least two or more columns in a non-sequential order.

14. The device of claim 1, further comprising:

a processor that is in electrical communication with said display, said processor being configured to process image data; and a memory device in electrical communication with said processor.

15. The device of claim 14, further comprising a controller configured to send at least a portion of said image data to said driving circuit.

16. The device of claim 14, further comprising an image source module configured to send image data to said processor.

17. The device of claim 16, wherein said image source module comprises at least one of a receiver, transceiver, and transmitter.

18. The device of claim 14, further comprising an input device configured to receive input data and to communicate said input data to said processor.

19. A display, comprising:

at least one driving circuit; and an array comprising a plurality of columns of interferometric modulators and a plurality of rows of interferometric modulators, said array being configured to be driven by said driving circuit, and said columns of interferometric modulators and rows of interferometric modulators having at least a released state and an actuated state, wherein said driving circuit is configured to receive column data for the plurality of columns, and is further configured to use the column data to non-simultaneously assert a signal on each of two or more columns of interferometric modulators during a column addressing period and maintain the asserted signal on each column during a row addressing period, and to strobe a row of the array during the row addressing period to actuate or release interferometric modulators in the columns of interferometric modulators disposed in said row.

20. A method of providing data to an array having a plurality of columns of interferometric modulators and rows of interferometric modulators, the method comprising:

asserting a signal on each column in a first group of one or more columns based on a first data set during a first group addressing period and maintaining the asserted signal on each column in the first group during a row addressing period;

asserting a signal on each column in a second group of columns using a second data set during a second group addressing period and maintaining the asserted signal on each column in the second group during the row addressing period, the row addressing period being subsequent to said first and second group addressing periods; and strobing a row of the array during the row addressing period to actuate or release interferometric modulators in the columns of interferometric modulators disposed in said row.

21. The method of claim 20, wherein the first group includes a different number of columns than the second group.

22. The method of claim 20, wherein the first group addressing period and the second group addressing period are in a predetermined order.

23. The method of claim 20, wherein the first group addressing period and the second group addressing period are in random order.

24. The method of claim 20, wherein the first group includes the same number of columns as the second group.

25. A driver circuit configured to drive an array of a plurality of interferometric modulators, each of the interferometric modulators being connected to a column electrode and a row electrode, the driving circuit comprising:

a storage device to store predetermined display data; and a signal device in data communication with said storage device, said signal device configured to assert a signal on each electrode of two or more columns and rows non-simultaneously, wherein the signals are based on the predetermined display data, wherein the predetermined display data includes information to stagger the assertion of a signal for two or more columns of interferometric modulators during a column addressing period and maintain the asserted signal on each column during a row addressing period, the row addressing period being subsequent to said column addressing period, and and wherein the predetermined display data further includes information to strobe a row of the array during the row addressing period to actuate or release interferometric modulators in the two or more columns of interferometric modulators disposed in said row.

26. A method of driving a display that includes an array having a plurality of interferometric modulators disposed in a plurality of columns and rows, said array being configured to be driven by a driving circuit, and said interferometric modulators having at least a released state and an actuated state, the method comprising:

staggering the assertion of a signal for two or more columns of interferometric modulators during a column addressing period and maintaining the asserted signal on each column during a row addressing period, the row addressing period being subsequent to said column addressing period; and strobing a row of the array during the row addressing period to actuate or release interferometric modulators in the two or more columns of interferometric modulators disposed in said row.

27. The method of claim 26, wherein each group contains the same number of columns.

28. The method of claim 26, wherein a group addressing period of each group is at least partially different than a group addressing period for any other group.

29. The method of claim 26, wherein a group addressing period of each group begins at a temporally distinct time.

30. The method of claim 26, wherein a group addressing period of two or more groups are in a predetermined order.

31. The method of claim 26, wherein a group addressing period of two or more groups are in a random order.

* * * * *

UNITED STATES PATENT AND TRADEMARK OFFICE

CERTIFICATE OF CORRECTION

PATENT NO. : 7,515,147 B2
APPLICATION NO. : 11/054703
DATED : April 7, 2009
INVENTOR(S) : Marc Mignard It is certified that error appears in the above-identified patent and that said Letters Patent is hereby corrected as shown below:

At column 14, line 5, in Claim 25, before “wherein” please delete “and”.

Signed and Sealed this
Fourteenth Day of June, 2011

David J. Kappos
*Director of the United States Patent and Trademark Office*